United States Patent
Foster et al.

(10) Patent No.: US 9,657,190 B2
(45) Date of Patent: May 23, 2017

(54) SEEDING COMPOSITION WITH COLOR AND FOAMING INDICATORS

(71) Applicants: Bryan Foster, Santa Barbara, CA (US); Andrew Tobias, Santa Barbara, CA (US)

(72) Inventors: Bryan Foster, Santa Barbara, CA (US); Andrew Tobias, Santa Barbara, CA (US)

(*) Notice: Subject to any disclaimer, the term of this patent is extended or adjusted under 35 U.S.C. 154(b) by 307 days.

(21) Appl. No.: 13/999,295

(22) Filed: Feb. 7, 2014

(65) Prior Publication Data

US 2015/0225591 A1    Aug. 13, 2015

(51) Int. Cl.

| | |
|---|---|
| *A01C 1/06* | (2006.01) |
| *C09D 129/04* | (2006.01) |
| *C09D 105/04* | (2006.01) |
| *C09D 105/00* | (2006.01) |
| *C08K 5/42* | (2006.01) |
| *C08K 5/41* | (2006.01) |
| *A01G 13/02* | (2006.01) |
| *C09J 133/04* | (2006.01) |

(52) U.S. Cl.
CPC ....... *C09D 129/04* (2013.01); *A01G 13/0256* (2013.01); *C08K 5/41* (2013.01); *C08K 5/42* (2013.01); *C09D 105/00* (2013.01); *C09D 105/04* (2013.01); *A01C 1/06* (2013.01); *C09J 133/04* (2013.01)

(58) Field of Classification Search
CPC .. A01C 1/00; A01C 1/046; A01C 1/06; A01C 7/06; A01C 7/004; A01G 13/0256; A01G 13/0262
USPC ............................................ 47/57.6, 58.1 SE
See application file for complete search history.

(56) References Cited

U.S. PATENT DOCUMENTS

| | | | | |
|---|---|---|---|---|
| 5,643,360 | A * | 7/1997 | Rensing | A01C 1/08 118/13 |
| 6,376,566 | B1 * | 4/2002 | Bergeron | A01N 25/16 47/1.5 |
| 2006/0236604 | A1 * | 10/2006 | Hesse | A01C 1/06 47/57.6 |
| 2009/0265980 | A1 * | 10/2009 | Spittle | C09K 17/52 47/9 |
| 2012/0270733 | A1 * | 10/2012 | Cush | A01N 25/04 504/100 |

* cited by examiner

*Primary Examiner* — Thien Thanh Pham
(74) *Attorney, Agent, or Firm* — Dan DeLaRosa

(57) ABSTRACT

A composition for coating seeds and related methods of manufacture are provided; and the composition comprises: at least one foaming agent and at least one color indicator.

19 Claims, No Drawings

SEEDING COMPOSITION WITH COLOR AND FOAMING INDICATORS

BACKGROUND OF THE INVENTION

Field of the Invention

The present invention relates to a formulation, composition, system and related methods for coating seeds with color and foaming indicators. More specifically, it relates to seed coating compositions having tacking agents, foaming agents, soil surfactants, and color indicators.

Summary of the Invention

In one embodiment, the present invention relates to a composition comprising at least one tacking agent, at least one foaming agent, at least one soil surfactant, and at least one color indicator.

In another embodiment, the tacking agent is selected from a group consisting essentially of naturally occurring and synthetic thickeners including but not limited to clays, bentonites, carboxymethyl cellulose (CMC), hydroxymethyl cellulose (HMC), hydroxy propyl methyl cellulose, guar, xantham, cellulose, locust bean, acacia, carrageenan, pullulan, konjac, alginate, cassein, collagen, and castor oil, polyacrylates, polyurethanes, polystyrene/butadienes, polyvinyl alcohols and combinations and mixtures thereof. For purposes of this invention, the term tacking agent is defined as any material or substance that allows at least two materials to attach to or adhere to one another.

In yet another embodiment, the foaming agent is selected from a group consisting essentially of anionic and nonionic surfactants, including but not limited to sulfonated linear alcohols, sulfonated alkyl aromatic alcohols; sulfonated linear alcohol ethoxylates, sulfonated alkyl aryl ethoxylates, alkyl ethoxylates, arylalkyl ethoxylates and mixtures and combinations thereof. For purposes of this invention, the term foaming agent is defined as any material or substance which reduces the surface tension of a liquid and facilitates the trapping of pockets of gas in liquid. In another embodiment, the alcohols are C12-18.

In still another embodiment, the soil surfactant is selected from a group consisting essentially of nonionic and anionic surfactants, alkyl ethoxylates, alkyl aryl ethoxylates, alkyl sulfates, aromatic sulfates, alkyl sulfonates, aromatic sulfonates and combinations and mixtures thereof. For purposes of this invention, the term soil surfactant is defined as any compound or substance which lowers the interfacial tension between a liquid and solid and allows for increased spreadability and wettability.

In still yet another embodiment, the color indicator is selected from a group consisting essentially of colorants, pigments, dyes, triphenylmethane, based acid dyes and phthalocyanine based reactive dyes, and combinations and mixtures thereof. For purposes of this invention, the term color indicator is defined as any material or substance that imparts color or uses color to indicate function or activity.

In a further embodiment, the composition further comprises seeds and the tacking agent adhere seeds to the soil.

In yet a further embodiment, the foaming agent and the color indicator are designed to act as indicators showing where the composition was applied. In still a further embodiment, the soil surfactant assist in allowing water to penetrate through the soil and holds moisture in and around the seeds for seed growth.

In still yet a further embodiment, the composition further comprises wetting agent. In another further embodiment, the wetting agent is water.

In yet another further embodiment, the composition is admixed with the seeds to coat the seeds prior to planting.

In still another further embodiment, the tacking agent is from about 10% to about 50%, said foaming agent is from about 10% to about 30%, said soil surfactant is from about 1% to about 10% said moisturizing agent is from about 1.5% to about 6%, and said color indicator is from about 10% to about 30% of said composition.

In another embodiment, the foaming agent is designed to act as an indicator by creating a foaming effect in area where the composition has been applied.

In yet another embodiment, the present invention relates to a composition manufactured by a process comprising: admixing at least one tacking agent, at least one foaming agent, at least one soil surfactant, and at least one color indicator.

In still another embodiment, the composition is admixed with seeds and the seeds are coated with the composition.

In still yet another embodiment, the composition coated seeds are designed to be planted in a desired area. In a further embodiment, the composition coated seeds are designed to be provided with a wetting agent and in yet a further embodiment, the wetting agent is water.

In still a further embodiment, the foaming agent creates foam to indicate where the composition coated seeds had been planted.

In still yet a further embodiment, the color indicator creates color to indicate where the composition coated seeds had been planted.

In another embodiment, the present invention provides for a method of manufacturing a coating composition for treating seeds, and the method comprises: admixing at least one tacking agent, at least one foaming agent, at least one soil surfactant, and at least one color indicator. In yet another embodiment, the composition is designed to be combined with seeds prior to planting.

In a further embodiment, the present invention relates to system for coating seeds, and the system comprises a formulation and said formulation comprises: at least one foaming agent and at least one color indicator and the composition is designed to be combined with seeds prior to planting.

In yet a further embodiment, the formulation further comprises seeds.

In another further embodiment, system further comprises a device for admixing the formulation with the seeds. In still a further embodiment, the device is designed to dispense the formulation coated seeds. In another embodiment, the device admixing occurs prior to dispensing.

DETAILED DESCRIPTION OF THE INVENTION

As required, detailed embodiments of the present invention are disclosed herein; however, it is to be understood that the disclosed embodiments are merely exemplary of the invention that may be embodied in various forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

The present invention relates to a composition and system for coating seeds with indicators showing where the seeds were planted. The following are numerous examples of various embodiments of the present invention and this application is not limited to these examples.

Example 1

In one example, the present invention utilizes arginate as the tacking agent, a sulfonated linear alcohol as a foaming agent and an acid dye as a color indicator. The ingredients and % range of the ingredient in the composition is set forth below in Table 1.

TABLE 1

| Ingredients: | Function: | % Range |
|---|---|---|
| Alginate | Tacking Agent | 10-50 |
| Sulfonated linear alcohol | Foaming Agent | 10-30 |
| Alkyl Sulfonate | Soil Surfactant | 1-10 |
| Acid Dye | Color Indicator | 10-30 |

Example 2

In another example, the present invention utilizes guar as the tacking agent, a sulfonated linear alcohol as a foaming agent and a reactive dye as a color indicator. The ingredients and % range of the ingredient in the composition is set forth below in Table 2.

TABLE 2

| Ingredients: | Function: | % Range |
|---|---|---|
| Guar | Tacking Agent | 10-50 |
| Sulfonated linear alcohol | Foaming Agent | 10-30 |
| Alkyl Ethoxylate | Soil Surfactant | 1-10 |
| Reactive Dye | Color Indicator | 10-30 |

Example 3

In yet another example, the present invention utilizes polyvinyl alcohol as the tacking agent, a sulfonated linear ethoxalate as a foaming agent and a pigment as a color indicator. The ingredients and % range of the ingredient in the composition is set forth below in Table 3.

TABLE 3

| Ingredients: | Function: | % Range |
|---|---|---|
| Polyvinyl alcohol | Tacking Agent | 10-50 |
| Sulfonated linear ethoxalate | Foaming Agent | 10-30 |
| Alkyl Sulfate | Soil Surfactant | 1-10 |
| Pigment | Color Indicator | 10-30 |

Example 4

In still another example, the present invention utilizes alcinate as the tacking agent, a sulfonated linear ethoxalate as a foaming agent and an acid dye as a color indicator. The ingredients and % range of the ingredient in the composition is set forth below in Table 4.

TABLE 4

| Ingredients: | Function: | % Range |
|---|---|---|
| Alcinate | Tacking Agent | 10-50 |
| Sulfonated linear ethoxalate | Foaming Agent | 10-30 |
| Alkyl aryl ethoxalate | Soil Surfactant | 1-10 |
| Acid Dye | Color Indicator | 10-30 |

Example 5

In still yet another example, the present invention utilizes alcinate, guar or polyvinyl alcohol (or mixtures thereof) as the tacking agent, a sulfonated linear alcohol as a foaming agent and a dye as a color indicator. The ingredients and % range of the ingredient in the composition is set forth below in Table 5.

TABLE 5

| Ingredients: | Function: | % Range |
|---|---|---|
| Alcinate, guar, polyvinyl alcohol or mixtures | Tacking Agent | 10-50 |
| Sulfonated linear alcohol | Foaming Agent | 10-30 |
| Dye | Color Indicator | 10-30 |

The various compositions described in Examples 1-5 are designed to be admixed, combined or used as coatings for seeds.

In one embodiment, the composition containing the tacking agent, foaming agent, soil surfactant and color indicator are placed in a container with the seeds and are allowed to be admixed thereby coating the seeds. The container is designed to receive a water source such as a hose and the container is designed with a venturi effect which sprays the newly coated seed from the nozzle to exactly where you want to plant a new lawn.

The tacking agent allows the composition to attach to the seeds. The color indicator and foaming agent indicates where the coated seeds have been sprayed or applied to the desired area. The soil surfactant is a substance that reduces the surface tension of a liquid, causing the liquid to spread across or penetrate more easily the surface of a solid, opening up the soil allowing water to flow through. Water penetration and saturation is extremely important in home lawns as most lawns have compaction areas that increase over time, as the soil is not being cultivated and is left in a compacted state. The ability for soil surfactant to bond water with soil particles allows the soil to become wet and hold water in the area that has just been seeded, ultimately keeping moisture in and around the soil aiding in seed germination and growth.

Therefore, the foregoing is considered as illustrative only of the principles of the invention. Further, since numerous modifications and changes will readily occur to those skilled in the art, it is not desired to limit the invention to the exact composition and operation shown and described, and accordingly, all suitable modifications and equivalents may be resorted to, falling within the scope of the invention.

What is claimed is:
1. A composition for coating seeds consisting of:
   at least one tacking agent selected from a group consisting of naturally occurring thickeners, synthetic thickeners, clays, bentonites, carboxymethyl cellulose (CMC), hydroxymethyl cellulose (HMC), hydroxy propyl methyl cellulose, guar, xantham, cellulose, locust bean, acacia, carrageenan, pullulan, konjac, alginate, cassein, collagen, and castor oil, polyacrylates, polyurethanes, polystyrene/butadienes, polyvinyl alcohols and combinations and mixtures thereof;
   at least one foaming agent selected from a group consisting of anionic surfactants, nonionic surfactants, sulfonated linear alcohols, sulfonated alkyl aromatic alcohols; sulfonated linear alcohol ethoxylates, sulfonated alkyl aryl ethoxylates, alkyl ethoxylates, arylalkyl ethoxylates and mixtures and combinations thereof;
   at least one soil surfactant selected from a group consisting of alkyl sulfates, aromatic sulfates, alkyl sulfonates, aromatic sulfonates and combinations and mixtures thereof; and at least one color indicator selected from a group consisting of colorants, pigments, dyes, triphenylmethane, based acid dyes and phthalocyanine based reactive dyes, and combinations and mixtures thereof, said composition is designed to be applied to seeds to form composition coated seeds and the composition coated seeds is designed to be applied to a target area on a lawn that is deficient of grass growth using a wetting agent, said foaming agent and said color indicator act as indicators showing where the seeds coated with said composition were applied, said tacking agent is from about 10% to about 50%, said foaming agent is from about 10% to about 30%, said soil surfactant is from about 1% to about 10%, and said color indicator is from about 10% to about 30% of said composition.

2. The composition of claim 1 wherein said composition is designed to be applied to seeds.

3. The composition of claim 2 wherein said composition is designed to be admixed with seeds to coat said seeds prior to planting.

4. The composition of claim 1 wherein said tacking agent adhere seeds to the soil.

5. The composition of claim 1 wherein the composition coated seeds is designed to be applied to a target area on a lawn that is deficient of grass growth using a wetting agent.

6. A system for coating seeds consisting of:
a composition consisting of at least one tacking agent selected from a group consisting of naturally occurring thickeners, synthetic thickeners, clays, bentonites, carboxymethyl cellulose (CMC), hydroxymethyl cellulose (HMC), hydroxy propyl methyl cellulose, guar, xantham, cellulose, locust bean, acacia, carrageenan, pullulan, konjac, alginate, cassein, collagen, and castor oil, polyacrylates, polyurethanes, polystyrene/butadienes, polyvinyl alcohols and combinations and mixtures thereof;
at least one foaming agent selected from a group consisting of anionic surfactants, nonionic surfactants, sulfonated linear alcohols, sulfonated alkyl aromatic alcohols; sulfonated linear alcohol ethoxylates, sulfonated alkyl aryl ethoxylates, alkyl ethoxylates, arylalkyl ethoxylates and mixtures and combinations thereof;
at least one soil surfactant selected from a group consisting of alkyl sulfates, aromatic sulfates, alkyl sulfonates, aromatic sulfonates and combinations and mixtures thereof;
at least one color indicator selected from a group consisting of colorants, pigments, dyes, triphenylmethane, based acid dyes and phthalocyanine based reactive dyes, and combinations and mixtures thereof;
seeds; and a wetting agent, wherein said composition is designed to be applied to said seeds to form composition coated seeds and the composition coated seeds is designed to be applied to a target area on a lawn that is deficient of grass growth using said wetting agent, said foaming agent and said color indicator act as indicators showing where the seeds coated with said composition were applied.

7. The composition of claim 6 wherein said wetting agent is water.

8. The composition of claim 7 wherein said soil surfactant assist in allowing water to penetrate through soil and holds moisture in and around said seeds for seed growth.

9. A process for treating lawns with indicators, said process comprising:
forming a composition consisting of at least one tacking agent selected from a group consisting of naturally occurring thickeners, synthetic thickeners, clays, bentonites, carboxymethyl cellulose (CMC), hydroxymethyl cellulose (HMC), hydroxy propyl methyl cellulose, guar, xantham, cellulose, locust bean, acacia, carrageenan, pullulan, konjac, alginate, cassein, collagen, and castor oil, polyacrylates, polyurethanes, polystyrene/butadienes, polyvinyl alcohols and combinations and mixtures thereof, at least one foaming agent selected from a group consisting of anionic surfactants, nonionic surfactants, sulfonated linear alcohols, sulfonated alkyl aromatic alcohols; sulfonated linear alcohol ethoxylates, sulfonated alkyl aryl ethoxylates, alkyl ethoxylates, arylalkyl ethoxylates and mixtures and combinations thereof, at least one soil surfactant selected from a group consisting of alkyl sulfates, aromatic sulfates, alkyl sulfonates, aromatic sulfonates and combinations and mixtures thereof, and at least one color indicator selected from a group consisting of colorants, pigments, dyes, triphenylmethane, based acid dyes and phthalocyanine based reactive dyes, and combinations and mixtures thereof,
admixing seeds with said composition thereby forming composition coated seeds, and
applying the composition coated seeds to a target area on a lawn that is deficient of grass growth using a wetting agent, said foaming agent will foam and said color indicator acts as indicators showing where the composition coated seeds were applied.

10. The process of claim 9 further comprising the step of providing a device for dispensing the composition coated seeds and using said wetting agent to apply said composition coated seeds to the target area of the lawn.

11. The process of claim 9 wherein said wetting agent is water.

12. The process of claim 9 wherein said tacking agent is from about 10% to about 50%, said foaming agent is from about 10% to about 30%, said soil surfactant is from about 1% to about 10%, and said color indicator is from about 10% to about 30% of said composition.

13. A method of treating lawns with seeds having indicators, said method comprises:
forming a composition consisting of at least one tacking agent selected from a group consisting of naturally occurring thickeners, synthetic thickeners, clays, bentonites, carboxymethyl cellulose (CMC), hydroxymethyl cellulose (HMC), hydroxy propyl methyl cellulose, guar, xantham, cellulose, locust bean, acacia, carrageenan, pullulan, konjac, alginate, cassein, collagen, and castor oil, polyacrylates, polyurethanes, polystyrene/butadienes, polyvinyl alcohols and combinations and mixtures thereof, at least one foaming agent selected from a group consisting of anionic surfactants, nonionic surfactants, sulfonated linear alcohols, sulfonated alkyl aromatic alcohols; sulfonated linear alcohol ethoxylates, sulfonated alkyl aryl ethoxylates, alkyl ethoxylates, arylalkyl ethoxylates and mixtures and combinations thereof, and at least one color indicator selected from a group consisting of colorants, pigments, dyes, triphenylmethane, based acid dyes and phthalocyanine based reactive dyes, and combinations and mixtures thereof;
providing seeds and coating seeds with said composition to form composition coated seeds;
using a wetting agent to apply said composition coated seeds to a target area on a lawn that is deficient of grass growth, said composition starts to foam when said composition coated seeds are applied to the target area, said foaming agent and said color indicator act as indicators showing where said composition coated seeds were applied on the lawn.

14. The method of claim 13 further comprises providing a device for dispensing said composition coated seeds.

15. The method of claim 14 wherein said composition coated seeds are dispensed from said device using said wetting agent.

16. The method of claim 15 wherein said wetting agent mixes with said composition coated seeds before being dispensed from said device.

17. The method of claim 16 wherein said tacking agent is from about 10% to about 50%, said foaming agent is from about 10% to about 30%, said soil surfactant is from about 1% to about 10%, said wetting agent is from about 1.5% to about 6%, and said color indicator is from about 10% to about 30% of said composition.

18. The method of claim 16 wherein said foaming agent creates foam to indicate where the composition coated seeds had been planted.

19. The method of claim 18 wherein said color indicator creates color to indicate where the composition coated seeds had